United States Patent [19]

Suggitt et al.

[11] 4,202,167
[45] May 13, 1980

[54] PROCESS FOR PRODUCING POWER

[75] Inventors: Robert M. Suggitt, Wappingers Falls; William N. Gilmer, Patterson, both of N.Y.; George N. Richter, San Marino, Calif.

[73] Assignee: Texaco Inc., White Plains, N.Y.

[21] Appl. No.: 18,820

[22] Filed: Mar. 8, 1979

[51] Int. Cl.² .............................................. F02C 3/22
[52] U.S. Cl. ................................. 60/39.02; 60/39.12; 48/197 R; 48/203; 48/212; 423/210
[58] Field of Search ............ 60/39.02, 39.12, 39.18 B; 48/197 R, 203, 206, 212, 215; 252/373; 423/656, 210 M

[56] References Cited

U.S. PATENT DOCUMENTS

| 3,720,625 | 3/1973 | Kapp et al. | 423/656 |
|---|---|---|---|
| 3,759,036 | 9/1973 | White | 60/39.12 |
| 3,868,817 | 3/1975 | Marion et al. | 252/373 |
| 3,873,845 | 3/1975 | Osthaus | 60/39.12 |
| 4,075,831 | 2/1978 | McGann | 48/197 R |

FOREIGN PATENT DOCUMENTS 56761  7/1967  German Democratic Rep. ..... 423/210 M

Primary Examiner—S. Leon Bashore
Assistant Examiner—Peter F. Kratz
Attorney, Agent, or Firm—Robert A. Kulason; Carl G. Ries; Robert Knox, Jr.

[57] ABSTRACT

An improved method for the generation of power in a combustion gas turbine utilizing fuel gas comprising hydrogen and carbon monoxide in which said fuel gas is subjected to a water gas shift reaction whereby said fuel gas is enriched in both hydrogen and carbon dioxide prior to combustion in said combustion gas turbine. Undesirable nickel compounds contained in said fuel gas are removed and undesirable carbonyl sulfide decomposed by said water gas shift reaction.

5 Claims, 2 Drawing Figures

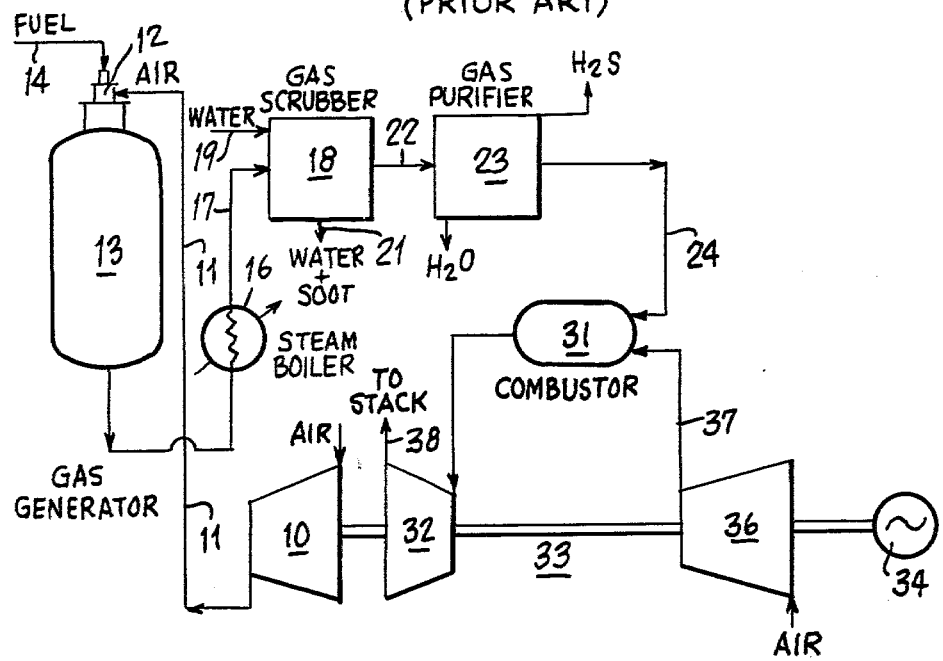
Fig. 1. (PRIOR ART)
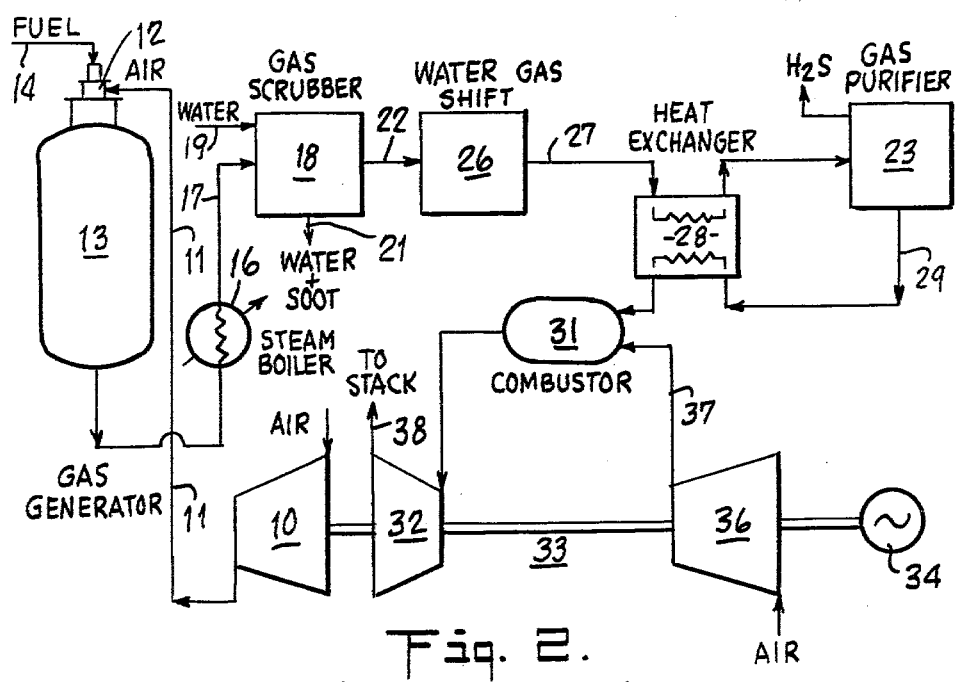
Fig. 2. (THIS INVENTION)

PROCESS FOR PRODUCING POWER

This invention relates to a method for improving the operation of a combined cycle power generation system. The process provides a means for increasing the efficiency of a combined cycle power generation facility, as compared with conventional combined cycle systems, and is particularly applicable to the operation of gas turbines for power generation using fuels containing various contaminants, notably nickel and sulfur, with minimal atmospheric pollution and reduced equipment maintenance. By the process of this invention, the capacity of a combined cycle power generation facility may be increased by the addition of a process step which also improves the purification of the fuel gas for the turbines.

The shortage of low sulfur crude oils and environmental regulations which restrict the relative amounts of sulfur compounds, oxides of nitrogen, and other contaminants which may be discharged into the atmosphere severely restricts the availability of fuels which may be used in combustion gas turbine power generation facilities. The shortage of petroleum products in various parts of the world, including the United States, has resulted in governmental regulations to conserve the dwindling supplies of natural gas which might otherwise be available as fuel for gas turbines. As a result, a number of industrial combustion gas turbine powered electrical generation facilities face the prospect of conversion to other fuels or a shutting down of the gas turbine powered systems. By the process of this invention, which involves the generation of low heating value fuel gas suitable for use in a gas turbines from various low grade fuels, such as petroleum residua, combustion gas turbine power generation facilities may be operated with low grade fuels without atmospheric pollution and without serious erosion or corrosion problems.

It has been proposed heretofore to convert various carbonaceous fuels to fuel gases of qualities ranging from low heating value fuel gases to gases of high calorific value which may be substituted for natural gas. In a co-pending patent application, Ser. No. 876,959, filed Feb. 13, 1978, now abandoned, and having a common assignee with this patent application there is disclosed a process for the generation of power from solid carbonaceous fuel with minimal atmospheric pollution wherein the fuel is subjected to a series of partial oxidation steps followed by complete combustion with the recovery of power from the gaseous products following each of the oxidation stages. The process of the co-pending application also provides for the removal of sulfur-containing gases from the fuel gas produced by the partial oxidation of carbonaceous fuels so that waste gases from the process are substantially free from sulfur compounds.

The process of this invention provides a method for producing power efficiently from various fuels, including low grade, high-sulfur content fuels and those containing nickel, which may be adapted to existing power plant systems employing gas turbines or combined cycle facilities. By the process of this invention, for example, it is possible to convert a clean fuel, combined cycle system to one capable of handling fuels containing sulfur and nickel without atmospheric pollution or serious metallurgical problems.

Generation of fuel gas by partial oxidation of a nickel-containing feed stock at relatively high temperatures of the order of 1,000° C. and higher, followed by rapid cooling to a temperature of the order of 300° C. or lower, results in the presence of nickel carbonyl in the product gas. In systems employing rapid cooling and acid gas scrubbing for the removal of sulfur compounds, nickel carbonyl may be present in the fuel gas stream in quantities of the order of 0.1 to 10 parts per billion, or $10^{-10}$ to $10^{-8}$ mols of nickel carbonyl per mol of fuel gas. This small amount of nickel carbonyl can create serious technical problems in the subsequent handling and usage of the fuel gas stream. For example, on reheating the fuel gas, the nickel carbonyl decomposes and nickel deposits accumulate on heat exchanger surfaces with deleterious effects on metallurgy.

The most effective way to destroy nickel carbonyl is by heating to a temperature above about 315° C. As already noted, however, indirect heating of the gas in a heat exchanger creates deleterious deposits of nickel. If traces of sulfur compounds are present in the gas stream, molten nickel sulfide formed in the heat exchanger can attack austenitic steels. The process of this invention provides a means for the effective removal of nickel carbonyl from the gas stream, which may be used in conjunction with conventional methods for the removal of sulfur-containing compounds therefrom, and produces a purified fuel gas which may be preheated in conventional heaters for efficient generation of power in combustion gas turbines.

In the process of this invention, carbonaceous fuel is subjected to partial oxidation with air at an elevated pressure and temperature effecting conversion of the carbonaceous fuel to a raw fuel gas stream comprising carbon monoxide, hydrogen, carbon dioxide, and nitrogen, and containing gaseous nickel and sulfur compounds including carbonyl sulfide. The partial oxidation can be carried out at a pressure above about 50 bars (725 psia) and a temperature above about 1200° C., with reactants at a temperature of at least 250° C. The raw fuel gas stream at elevated pressure may be cooled, preferably in a pressurized boiler, and treated for the removal of any solid particles present in the raw fuel gas. In accordance with this invention, the clean cooled raw fuel gas stream is subjected at elevated pressure to a water gas shift reaction which raises the temperature of the gas stream above about 315° C. The water gas shift reaction removes nickel carbonyl and decomposes any carbonyl sulfide present in the fuel gas stream. If sulfur compounds are present their removal is also simplified.

In conventional combined cycle power systems, the fuel gases, after cooling in a waste heat boiler, are scrubbed with water in a gas-liquid contactor which removes unburned carbon and other particulate solids from the gas stream. Following the solids removal step, the gases are supplied to an acid gas scrubber or gas purification system which removes the sulfur-containing gases, and usually at least a part of the carbon dioxide contained in the fuel gas stream to produce a non-polluting clean fuel gas. Preferably, carbon dioxide is left in the fuel gas stream as its presence is beneficial in the operation of a combustion gas turbine for the production of power. The removal of acid gases from the fuel gas stream in the acid gas scrubber system may be effected by any of the standard gas purification systems, for example, by scrubbing gas stream with an aqueous solution of hot potassium carbonate or with an aqueous solution of an amine, such as ethanolamine. The clean fuel gas stream, following the removal of sulfur compounds, is supplied to a combustion gas turbine where it is burned with air to provide working fluid for the gas turbine which, in turn, generates power.

In the process of this invention, as contrasted with the conventional process just described, the partially cooled gas stream from the gas generator, waste heat boiler, and water scrubber, is subjected to a water gas shift reaction in the presence of a catalyst to reheat the stream to a temperature above about 315° C. with resultant decomposition of nickel carbonyl to metallic nickel which is removed from the gas stream by e.g. an iron oxide catalyst. The water gas shift reaction enriches the fuel gas in hydrogen and carbon dioxide. The enriched fuel gas is then supplied to an acid gas scrubber, as in the case of the conventional system, for the removal of hydrogen sulfide. Preferably, carbon dioxide is not removed from the gas stream, but it may be necessary to remove some carbon dioxide with the hydrogen sulfide, depending on the purification system employed. Following the removal of hydrogen sulfide, the clean, purified gas stream may be heated by indirect heat exchange, e.g., by heat exchange with hot gases from the shift converter, and the preheated clean fuel gas supplied to the combustor of a combustion gas turbine for the production of power. The advantages of the process of the present invention, as compared with the conventional methods of operation of a combined power cycle will be evident from the specific examples below.

A principle object of this invention is to provide an improved process for the generation of power from carbonaceous fuels, especially those containing compounds of nickel and sulfur, in an economical and efficient manner with the production of an effluent stack gas which may be discharged to the atmosphere with minimal air pollution.

FIG. 1 of the drawings is a schematic representation of a combined cycle power system illustrating a conventional method of operation of a gas generator, gas purification system, and a combustion gas turbine-electrical generator set.

FIG. 2 of the drawings is a schematic representation of a combined cycle power system of the type illustrated in FIG. 1 showing a preferred embodiment of the process of this invention.

With reference to FIG. 1 of the drawings which represents a specific example of a conventional operation of a combined cycle power generation system, air is compressed in an air compressor 10 to a pressure of about 83 bar (1200 psia) and passed through supply line 11 to a suitable mixer-burner 12 of a high pressure partial oxidation reactor or gasifier 13. Carbonaceous fuel which may comprise sour natural gas or refinery off-gases, sulfur-containing fuel oil, heavy petroleum residuum, shale oil, liquified coal residues, pulverized coal, or the like, is supplied at a suitable elevated pressure through flow line 14 to the partial oxidation reactor 13. The partial oxidation reaction suitably is carried out in a reaction vessel of the type described in U.S. Pat. No. 2,992,906 to Frank E. Guptill, Jr., incorporated herein by reference.

The gasification reaction is carried out in the high pressure partial oxidation reactor 13 at an autogenously maintained temperature within the range of 980° to 1650° C. with substantially complete consumption of the combustible portions of the fuel to produce a high pressure raw fuel gas comprising carbon monoxide, hydrogen, carbon dioxide, and nitrogen, with minor amounts of methane, gaseous sulfur-containing compounds, principally hydrogen sulfide and carbonyl sulfide, if sulfur is present in the fuel.

The raw fuel gas product stream from the reactor 13 is passed to a pressurized boiler 16 where it is cooled with the generation of steam which is utilized in a steam turbine, not illustrated, for the production of power.

The cooled raw fuel gas stream from boiler 16 is then passed through line 17 to a gas scrubber 18, or particulates separator, where ash and unburned carbon, usually in the form of soot, are separated from the raw fuel gas by scrubbing with water introduced through line 19. A slurry of ash and carbon in water is removed from the scrubber through line 21 for disposal.

From the gas scrubber 18, the gas saturated with water vapor is passed through line 22 to a gas purification unit 23, or acid gas separator, for the removal of sulfur-containing gases from the fuel gas. Water, sulfur-containing gases, and some carbon dioxide are separated from the raw fuel gas in gas purification unit 23.

Purified fuel gas is passed through line 24 to the combustor 31 of a combustion gas turbine 32 where it is burned with excess air supplied by air compressor 36 to provide working fluid for the turbine. Turbine 32 generates power which is transmitted through shaft 33 to an electrical generator 34 and to air compressor 36.

Exhaust gases discharged from the gas turbine 32 at substantially atmospheric pressure through line 38 may be passed through a heat exchanger (not illustrated) for the generation of steam and preheating of feed water for boiler 16.

With reference to FIG. 2 of the drawings, the best mode contemplated for carrying out the method of this invention is illustrated. Wherever possible, the same reference numerals represent the same process steps and apparatus as in FIG. 1. By comparison of FIG. 2 with FIG. 1, it will be evident that a water gas shift reactor 26 has been introduced into the system between the gas scrubber 18 and the gas purification system 23.

In the water gas shift reactor, the raw fuel gas stream is reacted with the water vapor already present in the saturated stream to raise its temperature above about 315° C. effecting conversion of part of the carbon monoxide to hydrogen and decomposition of nickel carbonyl contained in the gases to metallic nickel. The metallic nickel is retained on the catalyst in the water gas shift reactor.

It should be understood that the gas purification system may be eliminated if sulfur-free or low sulfur fuels are employed in the gas generator. In this case, the water gas shift reactor protects the combustion gas turbine 31 from attack by nickel contained in the fuel gas stream as nickel carbonyl.

The water gas shift reactor suitably employs a sulfur-resistant cobalt molybdenum catalyst on an alumina support. Suitable water gas shift reactors and catalysts are well known in the art and, per se, form no part of the present invention. Other catalysts may be used in the water gas shift reactor.

From the shift converter 26, the hot gases are passed through line 27 to a heat exchanger 28 where they are cooled prior to introduction to gas purification system 23. Gases leaving the gas purification system 23 through line 29 are relatively cool and are reheated in heat exchanger 28 by indirect heat exchange with the relatively hot gases from shift converter 26 thereby supplying preheated fuel gas to combustor 31. The shift converter 26 removes nickel carbonyl from the fuel gas stream so that the gases after purification by removal of gaseous sulfur compounds in purification system 23 may be reheated in heat exchanger 28 without detriment to metal heat exchange surfaces. The advantage of the system of this invention will be more evident from the following calculated examples:

EXAMPLE 1

With reference to FIG. 1 of the drawings, the following is a specific example of typical conventional operation of a combined cycle power generation system in which a carbonaceous fuel is gasified with air, hot gases from the generator are cooled in a pressurized boiler generating steam which is utilized in a steam turbine for the production of power, the gas is cleaned to remove particulate solids and sulfur-containing gases, and the clean fuel gas burned in a combustion gas turbine for the generation of electrical power.

With reference to the figure, air is compressed in a multistage compressor 10 to a pressure of 83 bars (1200 psia) and delivered through supply line 11 at 260° C. (500° F.) at a rate of 401,157 Kg/hr (884,400 lb/hr) to a mixer-burner 12 of a high pressure partial oxidation reactor 13. Ten thousand barrels per day of a vacuum residuum having a sulfur content of 4.9% by weight and a lower heating value of 39 MJ/kg (16,771 Btu/lb) is supplied to burner 12 of the gasifier through line 14 at the rate of 67,041 Kg/hr (147,800 lb/hr) and a temperature of 260° C. (500° F.). Non-catalytic partial oxidation of the fuel to carbon monoxide and hydrogen takes place in reactor 13 at 83 bars (1200 psia) and 1400° C. (2550° F.) producing 468,198 Kg/hr (1,032,200 lb/hr) of raw fuel gas of the following composition:

| Raw Fuel Gas | |
|---|---|
| Component | Volume % |
| Carbon monoxide | 21.20 |
| Hydrogen | 13.39 |
| Carbon dioxide | 2.67 |
| Steam | 4.20 |
| Methane | 0.01 |
| Argon | 0.69 |
| Nitrogen | 57.29 |
| Hydrogen sulfide | 0.51 |
| Carbonyl sulfide | 0.04 |

Four percent of the carbon contained in the carbonaceous fuel to the gas generator or 2,313 Kg/hr (5,100 lb/hr) appears as unconverted carbon or soot in the product gas stream.

Raw fuel gas from the gasifier 13 at a temperature of 1400° C. and generator pressure is cooled in a pressurized boiler 16 to a temperature 232° C. (450° F.) with the generation of steam which is utilized in a steam turbine (not illustrated) for the generation of power.

The cooled raw fuel gas is scrubbed with water in gas scrubbing system 18 which effects removal of unconverted carbon and ash particulates contained in the raw fuel gas; in this example, 2,313 Kg/hr of carbon is removed as a water slurry together with the ash contained in the fuel oil. The scrubbed gas containing water vaporized in the gas scrubbing system is sent to the gas purification system 23 for the removal of gaseous sulfur compounds together with substantially all of the water vapor. In this example, carbon dioxide is not removed from the gas stream in purification system 23 as it is beneficial in combustion gas turbine operations.

The clean fuel gas has a lower heating value of 4.0903 MJ/m$^3$ (109.78 Btu/ft$^3$) and a higher heating value of 4.3537 MJ/m$^3$ (116.85 Btu/ft$^3$), and has the following composition:

| Clean Fuel Gas | |
|---|---|
| Component | Volume % |
| Carbon monoxide | 22.25 |
| Hydrogen | 14.05 |
| Carbon dioxide | 2.80 |
| Water vapor | 0.08 |
| Argon | 0.72 |
| Nitrogen | 60.10 |

The purified fuel gas is discharged from gas purification system 23 through line 24 at a pressure of 80 bars (1160 psia) and a temperature of 38° C. (100° F.) at a rate of 448,421 Kg/hr (988,600 lb/hr) to the combustor 31 of combustion gas turbine 32 where it is subjected to complete combustion. Air for combustion is supplied from compressor 36 at a temperature of 174° C. (345° F.) and a pressure of 80 bars (1160 psia) supplied to the combustor at a rate of 1,360,959 Kg/hr (3,000,400 lb/hr) generating 1,809,380 Kg/hr (3,989,000 lb/hr) of hot products of combustion containing excess air which is supplied to the turbine 32 at a temperature of 982° C. (1800° F.) and a pressure of 78.3 bars (1135 psia).

The hot gases from the combustor 31 are expanded in turbine 32 to a pressure of 1.03 bars (15 psia) and discharged to the atmosphere through line 38. Expansion in the turbine reduces the gas temperature to 241° C. (468° F.). Heat may be recovered from the exhaust gases by means of a waste heat boiler and feed water heater (not illustrated in the drawing).

In this example, the waste heat boiler recovers 740,270 MJ/hr (701,678×10$^3$ Btu/hr) of heat from the raw fuel gas generating steam which is supplied to a steam turbine (not illustrated) which recovers as power the equivalent of 296,284 MJ/hr (280,838×10$^3$ Btu/hr) for an overall steam cycle efficiency of 40%. The combustion gas turbine, operating at 89% efficiency, recovers as power the equivalent of 1,549,557 MJ/hr (1,468,774×10$^3$ Btu/hr) of which 752,139 MJ/hr (712,928×10$^3$ Btu/hr) is required to drive the air compressor for the gas turbine, resulting in a net power recovery equivalent to 797,418 MJ/hr (755,846×10$^3$ Btu/hr). The combined cycle steam turbine and gas turbine system recovers power equivalent to 1,093,700 MJ/hr (1,036,683×10$^3$ btu/hr) with an overall plant efficiency of 41.8% and a combined power output of 303.6 megawatts.

This example and Example 2 do not take into account the power requirements for pumping the fuel or feed water or for compressing the air for the synthesis gas generator. Plant efficiency in these examples is defined as the percentage of the amount of heat energy available from the raw fuel charged to the gas generator which is recovered as power from the turbines, taking into account the energy required for compressing air for the combustion gas turbine.

EXAMPLE 2

In this example of a preferred embodiment of the present invention, heavy vacuum residuum of Example 1 is supplied to a gas generator with air and reacted in the same proportions and under the same conditions of temperature, pressure, and flow rates as in Example 1. The raw fuel gas delivered from the gas generator at the rate of 468,198 Kg/hr (1,032,200 lb/hr) is cooled in the waste heat boiler 16 to 340° C. (645° F.) with the generation of steam. The cooled raw fuel gas is scrubbed with water in the gas-liquid contactor or gas scrubber 18 where it is cooled to 180° C. (358° F.) by the vaporization of 33,974 Kg/hr (74,900 lb/hr) of water introduced through line 19 of the gas liquid contactor at 38° C. (100° F.). In the gas scrubber, 2,313 Kg/hr (5,100 lb/hr) of unconverted carbon is removed from the raw fuel gas as a water slurry together with ash contained in the fuel oil.

The raw fuel gas, free of solid particles, and saturated with water vapor resulting from vaporization of water in the scrubbing zone 18 is passed through line 22 to shift converter 26 containing an active shift converter catalyst, for example, a sulfur-resistant cobalt molybdenum catalyst, where carbon monoxide is reacted with the water vapor to produce hydrogen and carbon dioxide. In this example, the gas stream containing 12.89 mol percent water vapor or 0.67 mol per mol carbon monoxide, enters the shift converter at 180° C. (358° F.) and undergoes a partial water gas shift reaction at a pressure of about 80 bars (1160 psia) with substantially complete consumption of the steam and an autogenous increase in temperature to 343° C. (650° F.). In general, the feed to the shift converter will contain from 0.5 to 0.75 mol water vapor (steam) per mol of carbon monoxide in the raw fuel gas. If the fuel supplied to the gas generator is a sulfur-free fuel or low sulfur fuel, the gas stream leaving the shift converter may be passed directly to the combustion gas turbine.

From the water gas shift converter 26, the raw fuel gas, enriched in hydrogen and carbon dioxide, is passed through line 27 at the rate of 499,859 Kg/hr (1,102,000 lb/hr) to heat exchanger 28 where it is cooled to a temperature of 98° C. (208° F.) by indirect heat exchange with purified fuel gas as described hereinafter and introduced into gas purification system 23 wherein hydrogen sulfide is separated from the gas stream to produce a purified fuel gas free from sulfur compounds and nickel carbonyl. The clean fuel gas has the following composition:

| Purified Fuel Gas | |
|---|---|
| Component | Volume % |
| Carbon monoxide | 6.42 |
| Hydrogen | 25.17 |
| Carbon dioxide | 15.39 |
| Water vapor | 0.08 |
| Argon | 0.63 |
| Nitrogen | 52.31 |

The purified fuel gas is discharged from the gas purification system 23 through line 29 at the rate of 496,412 Kg/hr (1,094,400 lb/hr) at a pressure of 77.9 bars (1,130 psia) and a temperature of 38° C. (100° F.) and is heated in heat exchanger 28 by indirect heat exchange with hot gases from shift converter 26 to a temperature of 288° C. (550° F.). Removal of nickel carbonyl by the shift converter makes it possible to reheat the purified gas stream in heat exchange apparatus without fouling the heat exchange surfaces.

Purified fuel gas is supplied to combustor 31 of combustion gas turbine 32 at a rate of 496,412 Kg/hr (1,094,400 lb/hr) at a pressure of 76.9 bars (1,115 psia) and 288° C. (550° F.). Air from air compressor 36 is supplied to combustor 31 through line 37 at the rate of 1,310,700 Kg/hr (2,889,600 lb/hr) at a pressure of 76.9 bars and a temperature of 173° C. (343° F.). The purified fuel gas is completely consumed in combustor 31 producing a hot gaseous working fluid for the combustion gas turbine 32 at the rate of 1,807,112 Kg/hr (3,984,000 lb/hr) at a pressure of 75.15 bars (1,090 psia) and a temperature of 982° C. (1800° F.). Exhaust gas discharged from combustion gas turbine 32 through line 28 to the stack is at a pressure of about 1.03 bars (15 psia) and a temperature of 249° C. (480° F.).

In this specific example illustrating a preferred embodiment of the present invention, the boiler 16 recovers 677,848 MJ/hr ($642,510 \times 10^3$ Btu/hr) of heat as steam which is converted by a steam turbine to the power equivalent of 271,228 MJ/hr (257,088 Btu/hr) with an overall steam cycle efficiency of 40 percent. The combustion gas turbine recovers as power the equivalent of 1,571,975 MJ/hr ($1,490,024 \times 10^3$ Btu/hr) with an efficiency of 89 percent. The air compressor for the gas turbine requires the equivalent of 715,653 MJ/hr (678,344 Btu/hr), for a net recovery by the combustion gas turbine of the power equivalent to 856,322 MJ/hr ($811,680 \times 10^3$ Btu/hr). The overall recovery of heat in the form of power from the steam turbine and from the gas turbine amounts to a total of 1,127,491 MJ/hr ($1,068,767 \times 10^3$ Btu/hr). The plant in this example produces 313 megawatts of power as electrical energy with a plant efficiency of 43.1%.

Comparison of the results of Example 2 illustrating the present invention with those of Example 1 illustrating current practice indicates that the process of this invention results in an increase in the power generating capacity of a combined cycle power generation plant of the type illustrated in FIG. 1. The indicated improvement in power recovery by the method of the present invention amounts to approximately 3 percent, i.e., an increase in power output of 9.4 megawatts for the plant of Example 2 as compared with the plant of Example 1 operated under comparable conditions. An additional advantage of the present invention is obtained when the fuel to the gasifier contains sulfur compounds which result in a raw fuel gas containing carbonyl sulfide. The presence of carbonyl sulfide in the raw fuel gas undergoing purification, for example, in a cold methanol purification system, even at a concentration less than one tenth that of hydrogen sulfide in the raw fuel gas, requires an increase in the size of the purification unit to nearly twice the size required for removal of the hydrogen sulfide alone. Thus, the decomposition of carbonyl sulfide which occurs in carrying out the process of this invention greatly reduces the size of the purification system required for sulfur removal and effects a further improvement over the prior art in addition to those demonstrated in the above examples.

We claim:

1. In a method for the generation of power wherein a nickel-containing carbonaceous or hydrocarbonaceous liquid or solid fuel is gasified by partial oxidation with oxygen-containing gas at an elevated temperature and pressure producing hot raw fuel gas comprising carbon monoxide and hydrogen admixed with nitrogen and carbon dioxide, the improvement which comprises cooling said hot raw fuel gas with the production of steam and expanding the so-produced steam in a heat engine with the production of power, passing said cooled raw fuel gas now containing nickel carbonyl in admixture with added steam or water vapor into contact with a water gas shift reaction catalyst at elevated pressure and a temperature above about 315° C.

effecting decomposition of nickel carbonyl and removal of nickel from the fuel gas stream and also effecting conversion of at least a portion of said carbon monoxide and steam in said fuel gas to carbon dioxide and hydrogen, thereby producing a fuel gas enriched in hydrogen and carbon dioxide, and subjecting said hydrogen and carbon dioxide-enriched fuel gas to substantially complete combustion and expansion of the products of combustion in a heat engine with the generation of power.

2. A method according to claim 1 wherein said raw fuel gas supplied to said shift conversion reaction contains from 0.5 to 0.75 mol steam per mol carbon monoxide.

3. A method according to claim 1 wherein said partial oxidation reaction is carried out at a pressure above about 50 days (725 psia) and at a temperature above about 1200° C. with reactants at a temperature of at least 250° C.

4. A method according to claim 1 wherein said carbonaceous or hydrocarbonaceous fuel contains sulfur compounds, the products of partial combustion contain gaseous sulfur compounds, and said gaseous sulfur compounds are removed from said fuel stream following said shift conversion reaction and prior to said complete combustion.

5. A method according to claim 4 wherein gaseous products from said shift conversion reaction are cooled from said shift conversion reaction temperature, gaseous sulfur compounds are removed from said cooled gas stream producing purified enriched fuel gas, said purified enriched fuel gas stream is reheated by indirect heat exchange with said enrichd fuel gas from said water gas shift reaction, and said reheated purified enriched fuel gas is subjected to complete combustion for the generation of power.

* * * * *